United States Patent [19]

Kassai

[11] Patent Number: 4,645,370
[45] Date of Patent: Feb. 24, 1987

[54] JOINT STRUCTURE FOR USE IN FOLDABLE BABY CARRIAGES

[75] Inventor: Kenzou Kassai, Osaka, Japan

[73] Assignee: Aprica Kassai Kabushikikaisha, Osaka, Japan

[21] Appl. No.: 797,000

[22] Filed: Nov. 8, 1985

[30] Foreign Application Priority Data

Nov. 19, 1984 [JP] Japan .............................. 59-175442[U]

[51] Int. Cl.$^4$ .............................................. F16C 11/06
[52] U.S. Cl. ........................................ 403/56; 403/122; 403/131; 280/42; 280/644; 280/650
[58] Field of Search .............. 280/644, 642, 647, 650, 280/658, 42; 297/44, 45; 403/123, 124, 126, 131, 56, 122

[56] References Cited

U.S. PATENT DOCUMENTS

| 4,245,850 | 1/1981 | Boudreau | 280/87.02 W |
| 4,317,581 | 3/1982 | Kassai | 280/644 |
| 4,335,900 | 6/1982 | Fleischer | 280/649 |
| 4,428,598 | 1/1984 | Kassai | 280/644 |
| 4,564,212 | 1/1986 | Orlandino et al. | 280/642 |

FOREIGN PATENT DOCUMENTS 50705  6/1982  Japan .................................. 280/644

Primary Examiner—John J. Love
Assistant Examiner—Eric D. Culbreth
Attorney, Agent, or Firm—W. G. Fasse; D. H. Kane, Jr.

[57] ABSTRACT

To interconnect a first member (19) and a second member (12) so that each of them may turn around two axes, a first axis (47) and a second axis (48) intersecting the first axis at a predetermined angle, a socket (29) having a bowl-like portion (32) defined by concentric hemispherical inner and outer surfaces (30, 31) and having an elongated opening (34) in the bottom is fixed to the first member, while an insert (25) having a spherical head portion (26) adapted to fit the hemispherical inner surface (30) and a shaft portion (27) radially extending from the spherical head portion is fixed to the second member with the shaft portion (27) extending through the elongated opening.

7 Claims, 17 Drawing Figures

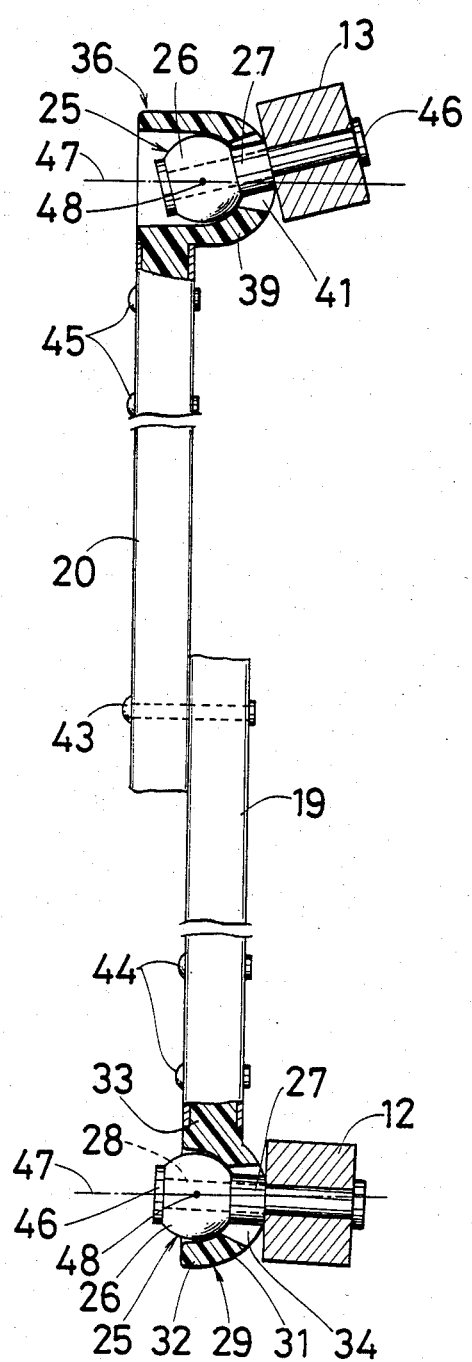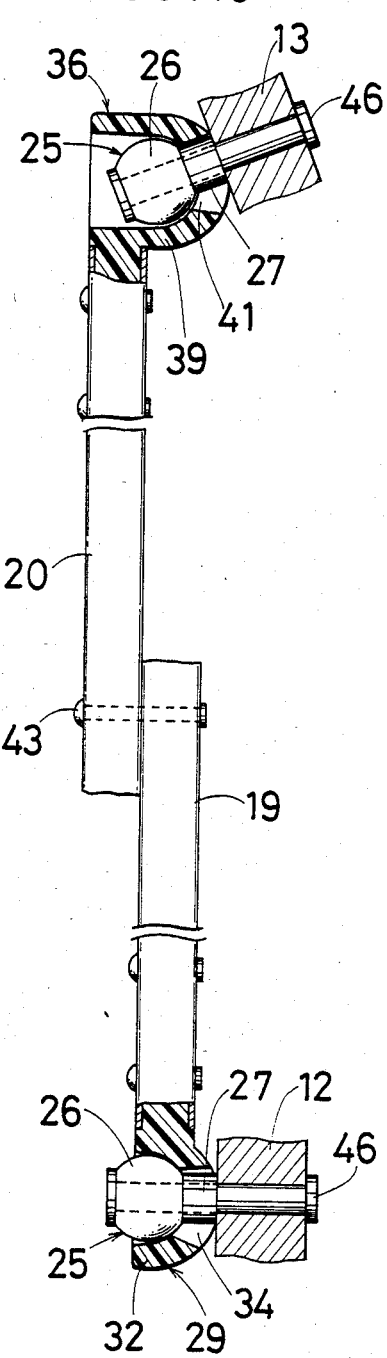

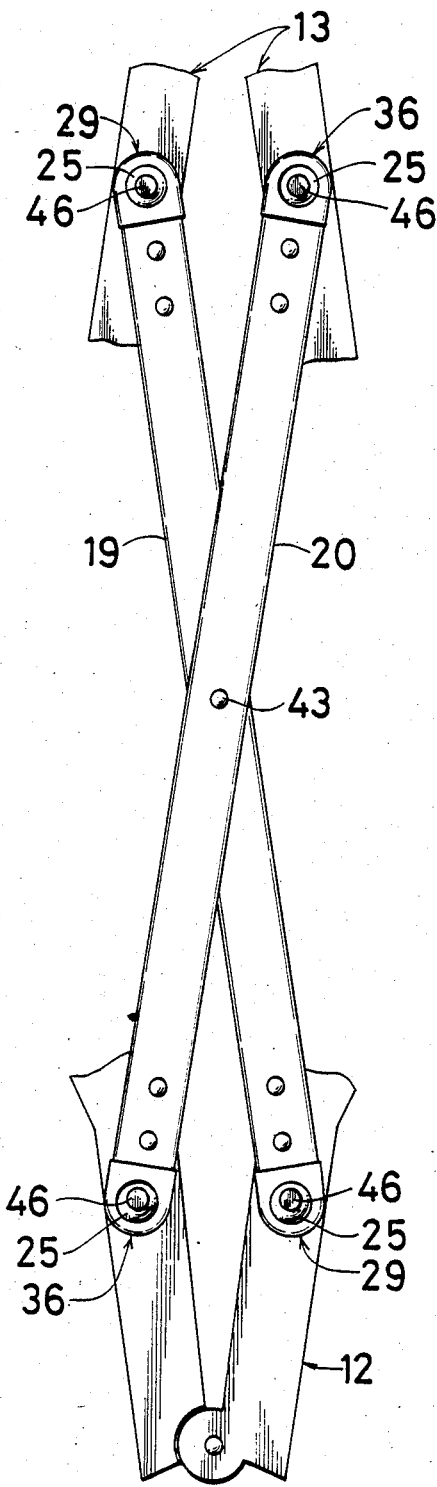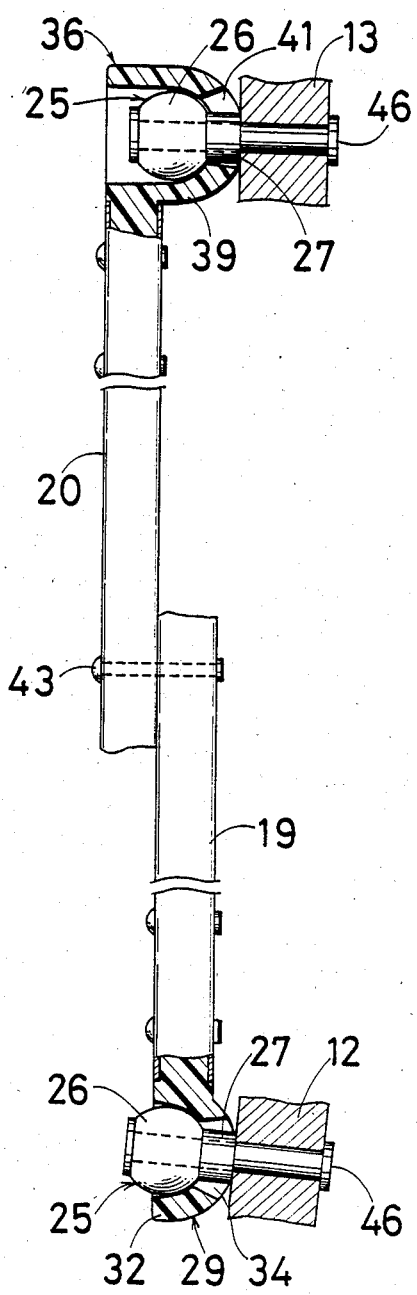
FIG. 16
FIG. 17

4,645,370

JOINT STRUCTURE FOR USE IN FOLDABLE BABY CARRIAGES

BACKGROUND OF THE INVENTION

This invention relates to a joint structure including ball joints for use in foldable baby carriages.

This invention is applicable, for example, to a baby carriage of basic foldable construction as disclosed in Japanese Patent Publication No. 50705/1982 (which substantially corresponds to U.S. Pat. No. 4,317,581) filed by the same applicant as in this application. The baby carriage disclosed in said publication is so designed that its dimensions in three directions, height, length and width, are decreased when the baby carriage changes from its opened to its closed state. Folding movements taking place in these directions are operatively associated with each other.

When such foldable baby carriage is observed, it is seen that the movements of some components taking place during folding operation are not confined to a single plane but require a three-dimensional space. For example, there is a case where if a joint which allows rotation only about a signal axis is used between one component and another connected thereto, the use of said joint is found insufficient; rather, a so-called universal joint which allows rotation around a first axis and rotation around a second axis which intersects the first axis at a predetermined angle is required. As a form of such universal joint, a ball joint may be considered.

A ball joint can be used as a joint portion which allows rotation around a first axis and rotation around a second axis, as described above. If, however, such ball joint, which allows rotation around axes extending in almost all directions, is used in a foldable baby carriage, there would be a case where contrarily it interferes with the opening and closing operation of the baby carriage. Thus, even if a ball joint is to be used in a foldable baby carriage, it would bring about better results to allow only the necessary movements to take place in the opening and closing operation of the baby carriages.

Usually, a ball joint must be so assembled that a ball received in a socket to form a ball articulation will not come off the socket. Attainment of such assembly, however, entails the use of complicated parts, and the assembly operation itself is often complicated.

SUMMARY OF THE INVENTION

Accordingly, an object of the invention is to provide a joint structure for use in foldable baby carriages, which is capable of restricting the degree of freedom of a ball joint which contrarily interferes with smooth opening and closing operation of a foldable baby carriage, said structure being simple in construction and being easy to assemble.

The joint structure of this invention uses ball joints whereby first and second members forming portions of a foldable baby carriage are interconnected in such a manner as to allow each of them to rotate around first and second axes intersecting each other at a predetermined angle during the folding operation of said baby carriage. Thus, so long as the aforesaid condition is satisfied, the invention is applicable to any joint portions of a foldable baby carriage.

A ball joint included in the joint structure of this invention comprises a socket and an insert adapted to be received in said socket, which, when coupled together, constitute a ball articulation. The socket comprises a top-opened bowl-like portion defined by concentric hemispherical inner and outer surfaces, and an attaching portion laterally extending from said bowl-like portion, the bottom of said bowl-like portion being formed with a lengthwise extending elongated opening having a width narrower than the diameter of the hemispherical inner surface. On the other hand, the insert comprises a spherical head portion having an outer surface formed to fit said hemispherical inner surface, and a shaft portion radially extending from said spherical head portion. In the assembled state, the socket is fixed to the first member through the attaching portion, while the insert is fixed to the second member through the shaft portion with the spherical head portion received in the bowl-like portion of the socket and with the shaft portion extending through the elongated opening in the socket.

It is so arranged that in such assembled state, rotative movement of the shaft portion around its axis within the elongated opening brings about rotation around said first axis and its translational movement brings about rotation around said second axis.

According to this invention, the insert forming a portion of the ball joint is allowed to move relative to the socket within limits within which the shaft portion is movable in the elongated opening. Thus, when the foldable baby carriage is doing its opening and closing operation, the first and second members are capable of three-dimensional movement while they are constrained relative to each other by the ball joint. Such constraint contributes to enabling the first and second members to perform a definite relative movement and is effective in ensuring a smooth opening and closing operation of the baby carriage.

The ball joint used for the joint structure of the invention is made up substantially of only two simple parts, a socket and an insert. In assembling the socket and insert to form a ball articulation, it is only necessary to insert the shaft portion of the insert through the elongated opening in the socket, in contrast to a complicated operation required for a conventional common ball joint wherein an insert is built in socket halves and then the latter are fixed together.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 13 is an enlarged sectional view taken along the line A—A in FIG. 12;

FIG. 15 is a view corresponding to FIG. 13, showing a state corresponding to that of FIG. 14;

FIG. 16 is a view corresponding to FIGS. 12 and 14, showing the closed state of the baby carriage; and FIG. 17 is a view corresponding to FIGS. 13 and 15, showing a state corresponding to that of FIG. 16.

DESCRIPTION OF THE PREFERRED EMBODIMENTS

Figure 1:
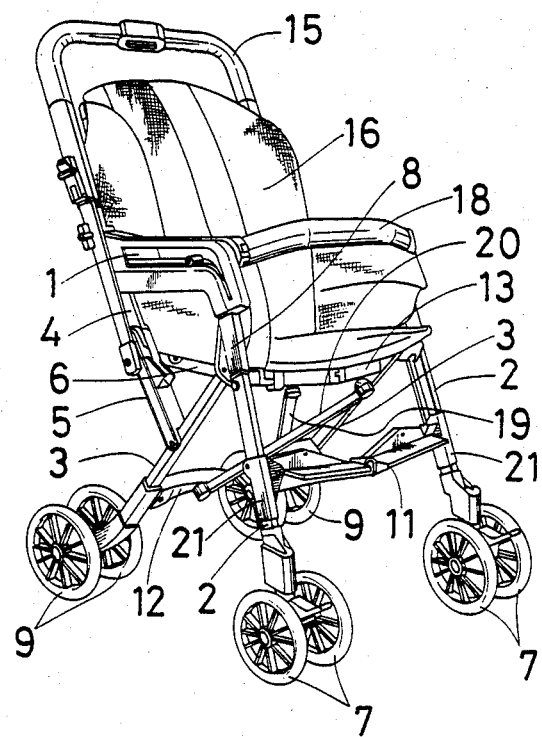
FIG. 1 is a front perspective view of a foldable baby carriage, shown in its opened state, to which an embodiment of the invention is applied.
Figure 2:
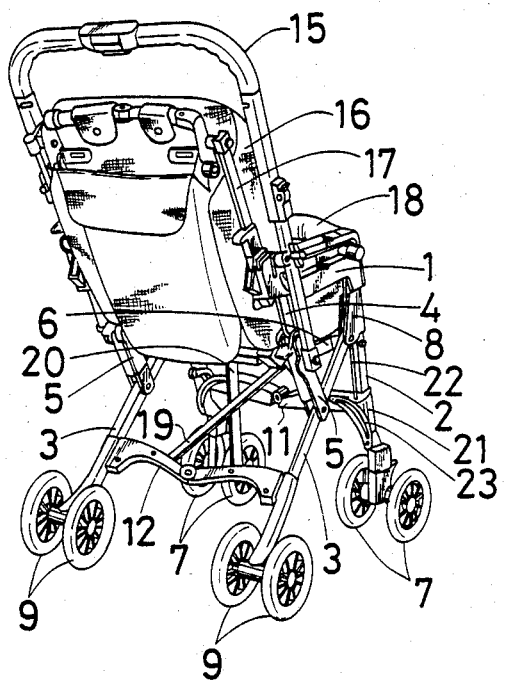
FIG. 2 is a rear perspective view of the foldable baby carriage of FIG. 1.
Figure 3:
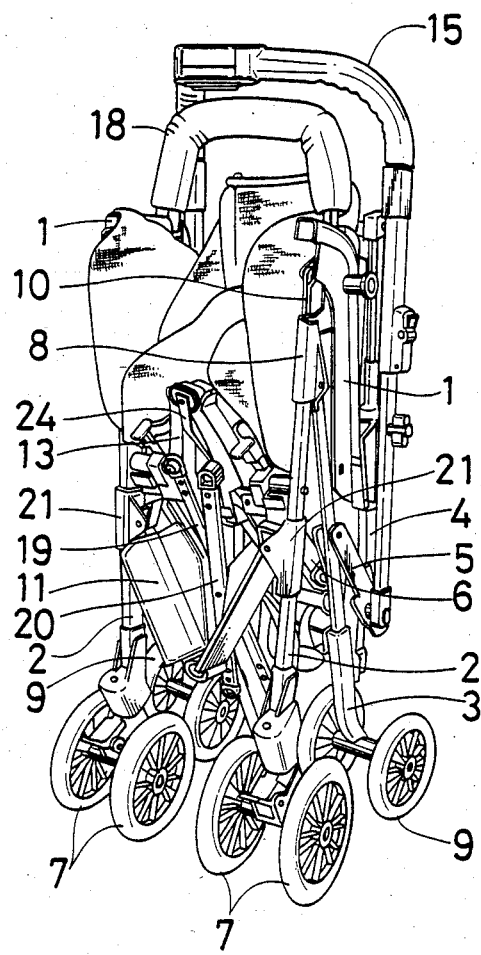
FIG. 3 is a front perspective view of the foldable baby carriage in its closed state.

FIGS. 1 through 3 show an example of a foldable baby carriage to which an embodiment of this invention is applied. FIG. 1 is a perspective view looking obliquely at the baby carriage in its opened state. FIG. 2 is a perspective view looking obliquely at the baby carriage in its opened state. FIG. 3 is a perspective view looking obliquely at the baby carriage in its closed state.

The illustrated foldable baby carriage has members disposed on the right and left lateral surfaces of the baby carriage, and other members extending widthwise for connecting said members on the lateral surfaces.

The members constituting the right and left lateral surfaces of the baby carriage basically include a pair of armrests 1, a pair of front legs 2, a pair of rear legs 3, a pair of upper support rods 4, a pair of lower support bars 5, and a pair of seat support rods 6.

The baby carriage will now be described in more detail while clarifying the relation between said members. Each armrest 1 is disposed to extend longitudinally and the front leg 2 is turnably connected to a relatively front portion of the armrest 1. The front leg 2 has front wheels 7 at its lower end. A slider 8 is longitudinally slidably fitted on the front leg 2. Each rear leg 3 is turnably connected to the associated slider 8. The rear leg 3 has rear wheels 9 at its lower end.

Each upper support rod 4 is turnably connected at its upper end to a relatively rear portion of the associated armrest 1. The lower support rod 5 is turnably connected at its one end to the middle of the rear leg 3 and at the other end thereof to the upper support bar 4. Each seat support bar 6 is turnably connected at its front end to the middle of the front leg 2 and at the other end thereof to the connection between the upper support bar 4 and the lower support rod 5. In addition, each slider 8 is connected to the lower end of a pull rod 10 (FIGS. 3 and 4) turnably connected to the armrest 1, at a position located forwardly of a pivot on the armrest 1 for turnably supporting the front leg 2.

Figure 4:
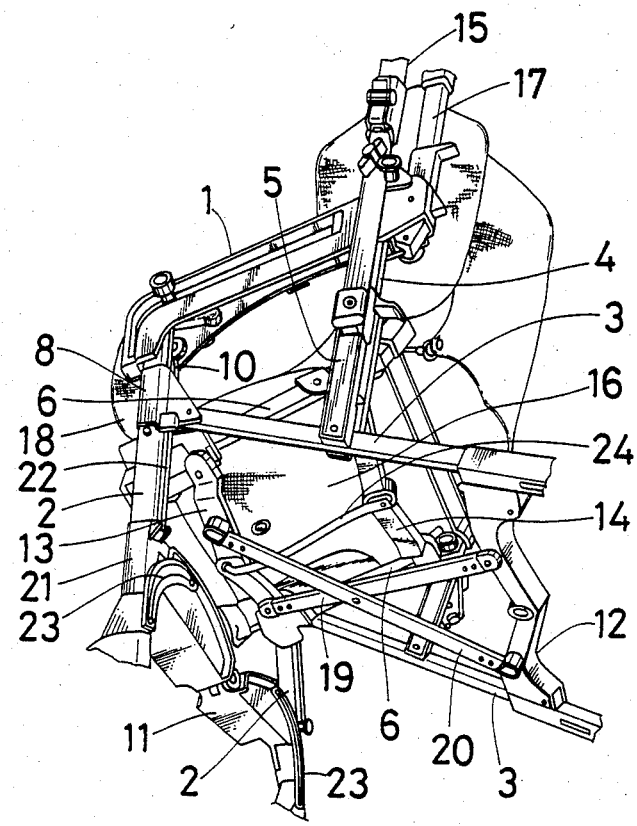
FIG. 4 is a fragmentary bottom perspective view of the same foldable baby carriage in its opened state, showing connections between cross rods 19, 20 and a rear leg connecting member 12 and between said rods and a front connecting member 13'.

Widthwise connecting means for connecting the aforesaid various members disposed on the right and left side surfaces of the baby carriage includes a front leg connecting member 11 connected between the pair of front legs 2, and a rear leg connecting member 12 connected between the pair of rear legs 3. As illustrated in FIG. 4 showing the baby carriage of FIGS. 1 through 3 in its opened state in a fragmentary perspective view taken from below, said means further includes two widthwise connecting members, or a front connecting member 13 and a rear connecting member 14, connected between the pair of seat support bars 6. As can be seen from a comparison between FIGS. 1, 2 and 3, the baby carriage is so designed that in the closed state, the width dimension is reduced. That is, the front leg connecting member 11, the rear leg connecting member 12, the front connecting member 13, and the rear connecting member 14 are each foldable at the middle and their folding movements cause the right and left side surfaces of the baby carriage to move toward each other.

Further, as illustrated, the baby carriage is provided with an inverted U-shaped push rod 15. The lower ends of the two longitudinally extending portions of the push rod 15 extend along and are substantially fixed to the upper support rods 4. The horizontally extending portion of the push rod 15 is foldable at the middle as in the case of the other widthwise connecting means.

Further, the middle of the baby carriage is formed with a seat 16. The seat 16 is held by the pair of armrests 1 and pair of seat support rods 6 and is placed on the front and rear connecting members 13 and 14. The backrest portion of the seat 16 is held by backrest holding rods 17. A torso guard 18 is installed to interconnect the front ends of the armrests 1. The torso guard 18 is foldable and, as shown in FIG. 3, will assume a folded position when the pair of armrests 1 approach each other.

As best shown in FIG. 4, disposed between the front connecting member 13 and the rear leg connecting member 12 are first and second cross rods 19 and 20 which cross each other X-wise. These cross rods 19 and 20 serve to establish the operative association between the respective folding movements of the front connecting member 13 and the rear leg connecting member 12, and a joint structure according to this invention is applied to the connection between the cross rods 19, 20, and the front connecting member 13 and the rear leg connecting member 12. In addition, this joint structure will be later described with reference to FIGS. 5 and the following figures.

The opening and closing operation of this foldable baby carriage will now be described In the opened state of the baby carriage shown in FIGS. 1, 2 and 4, the upper and lower support rods 4 and 5 are held extended in a line by suitable locking means. Further, the front and rear legs 2 and 3 are held with their lower ends spaced apart from each other. The armrests 1 are in their horizontally extended position. Further, the front leg connecting member 11, the rear leg connecting member 12, the front connecting member 13 and the rear connecting member 14 are held such that the distance between the opposite ends of each member is at a maximum.

When it is desired to close the baby carriage, first, the locking means is inactivated. Then, when the closing operation is started, the following various movement proceed almost simultaneously.

The upper and lower support rods 4 and 5 are folded, with the lower support rods 5 brought to extend along substantially the lower halves of the rear legs 3.

Thereby, the push rod 15 is brought to a relatively lower position. Further, with the aforesaid movement of the lower support rods 5, the armrests 1, accompanying the upper support rods 4, are turned with their rear ends descending. Thus, the front ends of the armrests 1 move upward, so that the sliders 8 are pulled up along the front legs 2 by the pull rods 10. The sliding movement of the sliders 8 on the front legs 2 causes the folding of the front leg connecting member 11. That is, the front leg connecting member 11 is connected at its opposite ends to the second sliders 21. The second sliders 21 are slidably mounted on the front legs 2 in the same manner as that for the sliders 8 and their sliding movements are operatively associated with each other by the connecting rods 22. Therefore, when the sliders 8 slide upward along the front legs 8, the second sliders 2 also slide upward. Angle members 23 are connected between the front leg connecting member 11 and the front legs 2 so that in response to the upward slide movement of the second sliders 21, the front legs connecting member 11 is folded with its foldable portion projecting downward.

Further, the horizontal portion of the push rod 15 is folded by the operator's hands, and with the folding of said front leg connecting member 11, the members constituting the right and left side surfaces of the baby carriage move toward each other. Thereby, the distance between the seat support rods 6 is reduced and the front connecting members 13 are folded. The folding movement of the front connecting members 13 is transmitted to the rear connecting member 14 through a connecting rod 24. The folding movement of the front connecting member 13 is also transmitted to the rear leg connecting member 12 through the cross rods 19 and 20. At this time, moving toward each other for parallelism, though not perfect parallelism, the cross rods 19 and 20 function to thrust against and between the front connecting member 13 and the rear leg connecting member 12 to thereby fold the front connecting member 13 and the rear leg connecting member 12 in opposite directions.

Reversely, when it is desired to change the baby carriage from its closed to its opened state, the aforesaid operation is performed in the reverse order.

When the connections between the cross rods 19, 20 and the rear leg connecting member 12 or the front connecting member 13, which characterize the invention, are observed, it is seen that therein take place two turning movements, one around a first axis and the other around a second axis which intersects the first axis at a predetermined angle. That is, the movements taking place between the rear leg connecting member 12 or the front connecting member 13 and the cross rods 19, 20 are not confined to a single plane. This is because the rear leg connecting member 12 is attached between the rear legs 3 while the front connecting member 13 is attached between the seat support rods 6 and because the rear legs 3 and the seat support rods 6 are being displaced while changing their angles relative to each other.

In FIGS. 5 through 11, parts according to this invention are separately shown. Combining these parts provides a ball joint of simple construction.

Figure 5:
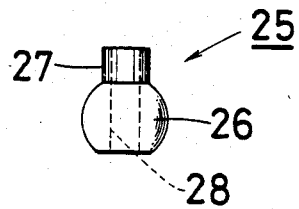
FIG. 5 is a front view of an insert 25 forming one part of a ball joint.

FIG. 5 is a front view of an insert 25 which forms one ball articulation component of a ball joint. The insert 25 comprises a spherical head portion 26 having a substantially spherical outer surface, and a shaft portion 27 radially extending from said spherical head portion 26.

The insert 25 is formed with a throughgoing hole 28 extending along the axis of the shaft portion 27.

Figure 6:
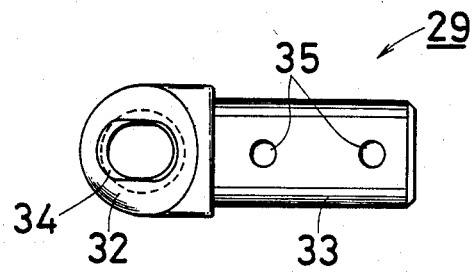
FIG. 6 is a plan view of a first socket 29 forming the other part of the ball joint.
Figure 7:
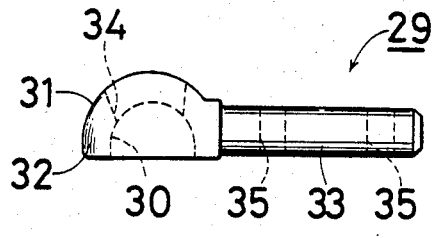
FIG. 7 is a front view of the first socket 29 of FIG. 6.
Figure 8:
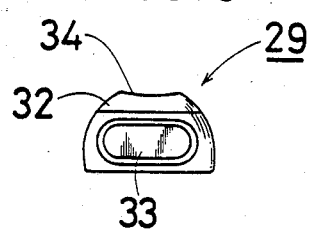
FIG. 8 is a right-hand side view of the first socket 29 of FIG. 6.

In FIGS. 6 through 8, a first socket 29 forming the other ball articulation component of the ball joint is shown. FIG. 6 is a plan view; FIG. 7 is a front view; and FIG. 8 is a right-hand side view. The socket 29 comprises a bowl-like portion 32 defined by concentric hemispherical inner and outer surfaces 30 and 31, said bowl-like portion being opened at its top surface (lower surface in the illustrated position), and an attaching portion 33 laterally extending from said bowl-like portion 32. The bottom of the bowl-like portion 32 (which corresponds to the upper portion of the bowl-like portion 32 in the illustrated position) is formed with a lengthwise extending elongated opening 34 having a width smaller than the diameter of the hemispherical inner surface 30. Further, the attaching portion 33 is formed with attaching holes 35.

Figure 9:
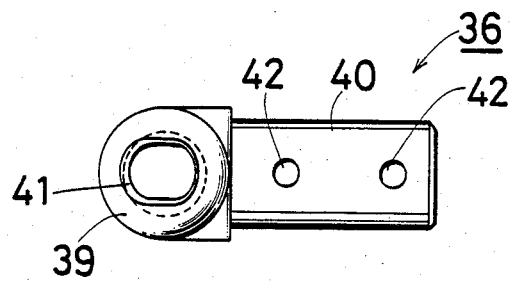
FIG. 9 is a plan view of a second socket 36 forming the other part of a ball joint.
Figure 10:
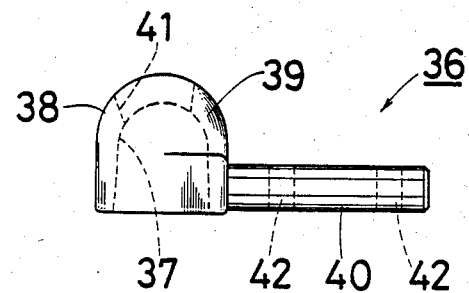
FIG. 10 is a front view of the second socket 36 of FIG. 9.
Figure 11:
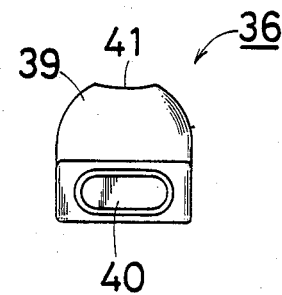
FIG. 11 is a right-hand side view of the second socket 36 of FIG. 9.

In FIGS. 9 through 11 is shown a second socket 36 which is based on the same principle as that of the first socket 29 but which is used in a location different from that for the first socket 29. The second socket 36, like the first socket 29, also comprises a hemispherical inner surface 37, a hemispherical outer surface 38, a bowl-like portion 39, an attaching portion 40, an elongated opening 41, and attaching holes 42. What differentiates the second socket 36 from the first socket 29 is the attaching position of the attaching portion 40; the attaching portion 40 is formed at a position farther away from the bottom of the bowl-like portion 39. Thus, the height of the bowl-like portion 39 is increased.

Figure 12:
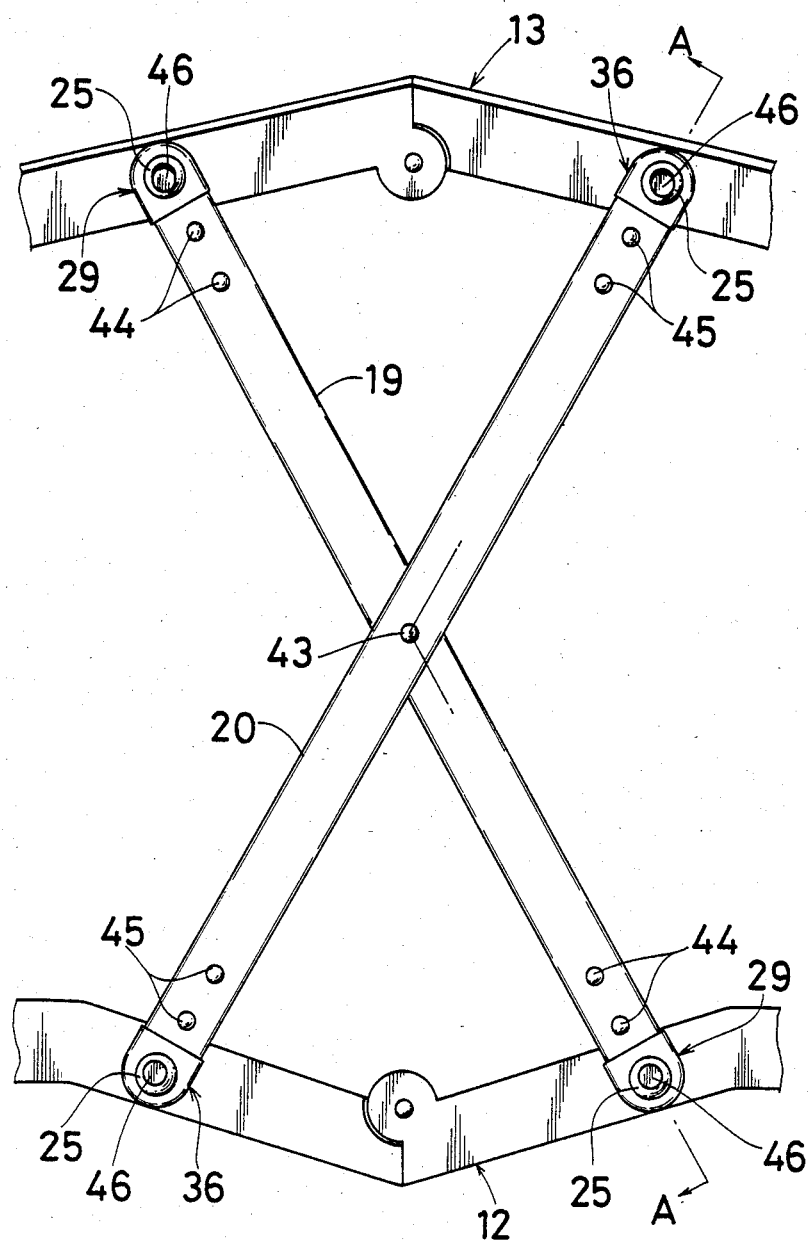
FIG. 12 is a view of the principal portions of the embodiment of the invention, showing the cross rods 19, 20 and the rear leg connecting member 12 and front connecting member 13 to be connected to said cross rods.

FIG. 12 shows the cross rods 19 and 20 as viewed from below the baby carriage, the cross rods 19 and 20 being shown extending parallel to the plane of the paper. FIG. 13 is an enlarged view of the cross rods 19 and 20 shown partly in section taken along the line A—A in FIG. 12. First, referring to FIGS. 12 and 13, the joint structure will be described with regard to the connections between the cross rods 19, 20 and the rear leg connecting member 12 or the front connecting member 13. The cross rods 19 and 20 are each formed of a pipe having an oval cross-section similar to that of the attaching portions 33 and 40 shown in FIGS. 8 and 11. Speaking in terms of the relation shown in FIG. 12, the first and second cross rods 19 and 20 are installed crossing each other, with the former underlying the latter. They are turnably connecting together at their intersection by a pin 43.

The first cross rod 19 has first sockets 29 fixed to its opposite ends. That is, the attaching portions 33 of the first sockets 29 are inserted in the ends of the first cross rod 19, and the first cross rod 19 and the first sockets 29 are fixed together by rivets 44 extending through the attaching holes 35. On the other hand, the second cross rod 20 has second sockets 36 fixed to its opposite ends by rivets 45. As is clear from FIG. 13, since the first and second cross rods 19 and 20 are straight, their overlap region results in a difference in height between the ends of the cross rods 19 and 20. That is, the ends of the second cross rod 20 are at a higher position than the ends of the first cross rod 19. However, referring to FIG. 12, since the ends of the first cross rod 19 and the ends of the second cross rod 20 are connected to the same member, that is, the rear leg connecting member 12 or the front connecting member 13, there arises a need to accommodate this difference in height by some means or other. In connection with the accommodation of the difference in height, the difference in position between the attaching portions 33 and 40 of the first and second sockets 29 and 36, as described above, comes to work effectively.

The insert 25 adapted to be combined with the socket 29 or 36 to form a ball articulation will now be described as to how it is attached. The insert 25 is used with the first socket 29 and also with the second socket 36.

A description will be given of a case where the insert is attached to the rear leg connecting member 12 in association with the first socket 29. With the spherical head portion 26 received in the bowl-like portion 32 of the socket 29, the shaft portion 27 is inserted through the elongated opening 34 until it contacts the rear leg connecting member 12, and in this state, the insert 25 is fixed to the rear leg connecting member 12 by a pin-like member 46 extending through the throughgoing hole 28. In addition, at this time, it is preferable from the standpoint of ensuring a rattle-free, stabilized operation that the length of the shaft portion 27 and the thickness of the bowl-like portion 32 be such that the hemispherical outer surface 31 of the bowl-like portion 32 contacts the surface of the rear leg connecting member 12.

The other connections have the same construction, and a repetitive description will be avoided by marking like parts with like reference numerals.

Figure 14:
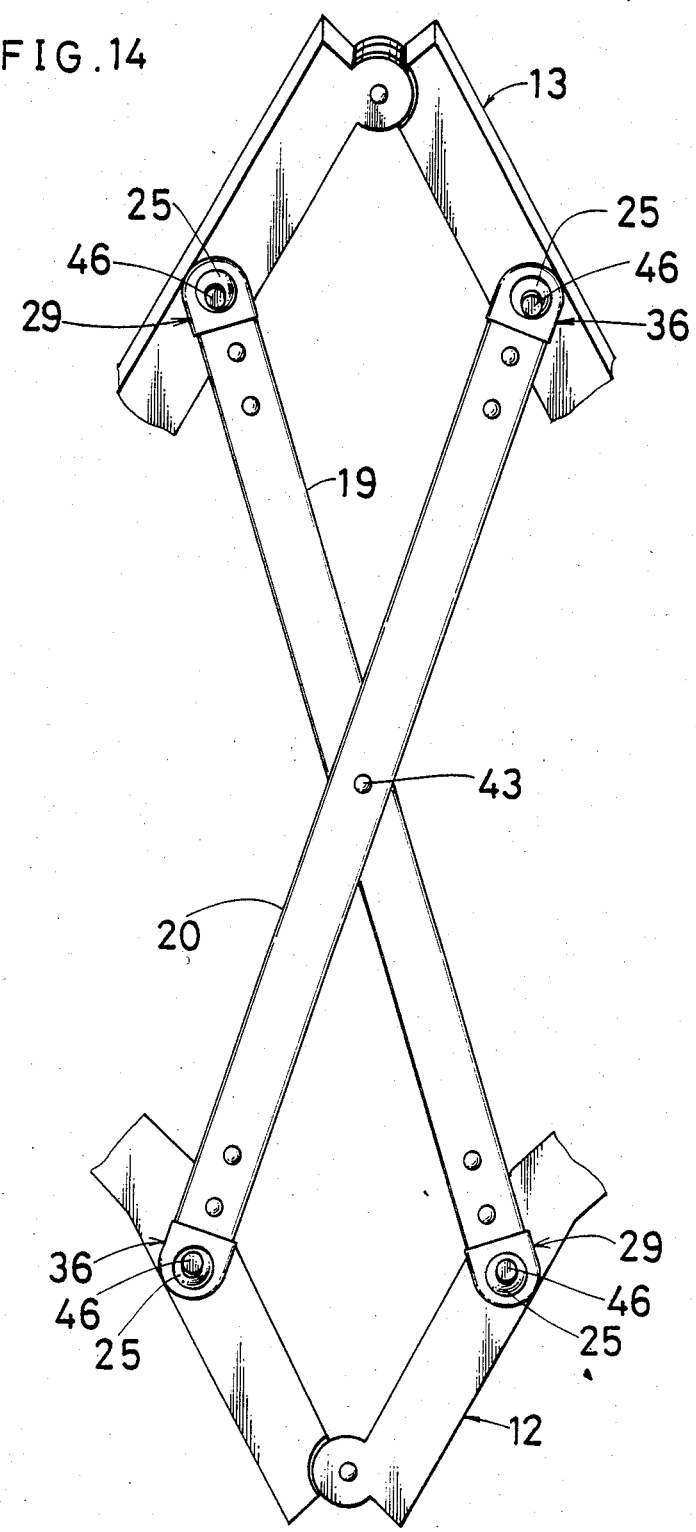
FIG. 14 is a view corresponding to FIG. 12, but showing a state of the baby carriage intermediate between its opened and its closed states.

Referring to FIGS. 14 through 17 together with FIGS. 12 and 13, the operation of the joint structure used in the connections between the cross rods 19, 20 and the rear leg connecting member 12 or the front connecting member 13 will now be described. In addition, FIGS. 14 and 16 correspond to FIG. 12; in FIG. 14 a state of the baby carriage intermediate between the opened state and the closed state is shown and in FIG. 16 the closed state is shown. FIGS. 15 and 17 correspond to FIG. 13; FIG. 15 shows the state of FIG. 14 and FIG. 17 shows the state of FIG. 16.

First, referring to FIGS. 12, 14 and 16, it is seen that the first and second cross rods 19 and 20 turn around first axes 47 (FIG. 13) perpendicular to the cross rods 19 and 20 and passing through the bowl-like portions 32 and 39 of the sockets 29 and 36, relative to both the rear leg connecting member 12 and the front connecting member 13. The turning movement around the first axis 47 is brought about by the shaft portion 27 turning around its own axis within the elongated opening 34 or 41.

Referring to FIGS. 13, 15 and 17, it is seen that the cross rods 19 and 20 turn around second axes 48 (each indicated by a dot "•" in FIG. 13; a line passing through the dot at right angles to the plane of the paper is such second axis 48) each intersecting the first axis 47 at a predetermined angle, or right angle in this embodiment, relative to both the rear leg connecting member 12 and the front connecting member 13. During such turning around the second axis, the shaft portion 27 makes a translational movement in the elongated opening 34 or 41.

As can be seen from a comparison between FIGS. 15 and 17, the range of translational movement of the shaft portion 27 in the elongated opening 41 in the second socket 36 coincides with the longitudinal extent of the elongated opening 41. The longitudinal extent of the elongated opening 41 may be greater but is required to at least coincide with the range of translational movement of the shaft portion 27 in the elongated opening 34 or 41 brought about by the displacements of the cross rods 19, 20 and the rear leg connecting member 12 or the front connecting member 13 during the opening and closing operation of the foldable baby carriage.

In the above embodiment, the pin-like member 46 has been used in fixing the insert 25 to the rear leg connecting member 12 or the front connecting member 13, but other fixing means, such as screw threads or adhesive agents, may be used. Further, the manner of fixing the sockets 29 and 36 to the cross rods 19 and 20 is not limited to the illustrated one; any other suitable fixing means may be used.

Further, the locations to which the joint structure of this invention is applicable are not limited to the particular ones described in the embodiment; it is applicable to some locations in other various types of foldable baby carriages. In brief, the joint structure of this invention can be advantageously used where two members must be connected together in the manner described in the embodiment wherein first and second members forming portions of a foldable baby carriage are connected together so that during the opening and closing operation of said baby carriage they are each turnably around a first axis and around a second axis which intersects said first axis at a predetermined angle. In this case, the shape of the elongated opening formed in the bowl-like portion of the socket can be changed as needed.

Although the present invention has been described and illustrated in detail, it is clearly understood that the same is by way of illustration and example only and is not to be taken by way of limitation, the scope of the present invention being limited only by the terms of the appended claims.

What is claimed is:

1. A joint structure using ball joints for use in foldable baby carriages in interconnecting first and second members (19, 20 and 12, 13) forming portions of a foldable baby carriage in such a manner that during the folding operation of said baby carriage, they are each turnable around two axes, a first axis (47) and a second axis (48) which intersects said first axis at a predetermined angle, said joint structure being characterized in that:

said ball joint comprises a socket (29, 36) and an insert (25) adapted to be received in said socket, which, when combined, constitute a ball articulation, said socket comprises a bowl-like portion (30, 37) defined by concentric hemispherical inner and outer surfaces (30, 37 and 31, 38), the upper surface of said bowl-like portion being opened, and an attaching portion (33, 49) laterally extending from said bowl-like portion, the bottom of said bowl-like portion being formed with a lengthwise extending elongated opening (34, 41) having a width smaller than the diameter of said hemispherical inner surface, said insert comprises a spherical head portion (26) formed to fit the hemispherical inner surface, and a shaft portion (27) radially extending from said spherical head portion, said socket is fixed to said first member (19, 20) through said attaching portion, while said insert is fixed to said second member (12, 13) through said shaft portion, with said spherical head portion received in the bowl-like portion of said socket and with said shaft portion extending through said elongated opening, and the rotational movement of said shaft portion around its own axis within said elongated opening brings about a turning movement around said first axis

(47) and its pivotal movement brings about a turning movement around said second axis (48).

2. A joint structure for use in foldable baby carriages as set forth in claim 1, wherein with the hemispherical outer surface (31, 38) of said bowl-like portion contacting the surface of said second member (12, 13), said socket (29, 36) engages said insert (25).

3. A joint structure for use in foldable baby carriages as set forth in claim 1, wherein said insert (25) has a throughgoing hole (28) extending along the axis of said shaft portion (27) and is fixed to said second member (12, 13) by a pin-like member (46) extending through said throughgoing hole.

4. A joint structure for use in foldable baby carriages as set forth in claim 1, wherein the longitudinal extent of the elongated opening (34, 41) coincides with the range of translational movement of said shaft portion (27) in the elongated opening (34, 41) brought about by the displacements of said first and second members (19, 20 and 12, 13) produced during the opening and closing operation of the foldable baby carriage.

5. A joint structure for use in foldable baby carriages as set forth in claim 1, wherein:

said first member includes first and second cross rods (19, 20) intersecting each other and pivotally supported at the intersection (43), and said second member includes a foldable link rod (12) having a foldable portion in the middle and connected at positions on both sides of said intersection to one end of said first cross rod (19) and to one end of said second cross rod (20), and said ball joints are used at the connections between said first and second cross rods and the foldable link rod.

6. A joint structure for use in foldable baby carriage as set forth in claim 5, wherein:

said second member further includes a second foldable link rod (13) connected to the other end of said first cross rod (19) and to the other end of said second cross rod (20), and said ball joints are also used in the connections between the first and second cross rods and the second foldable link rod.

7. A joint structure for use in foldable baby carriage as set forth in claim 5, wherein said first and second cross rods (19, 20) are straight and overlap each other at their intersection and therefore they differ in height at their ends, so that the position of said attaching portion of said socket attached to said first cross rod differs from the position of said socket attached to said second cross rod.

* * * * *